United States Patent
Ahn et al.

(10) Patent No.: US 6,804,184 B2
(45) Date of Patent: Oct. 12, 2004

(54) OPTICAL DISC DRIVE

(75) Inventors: Cheol-woong Ahn, Seoul (KR); Pil-je Cho, Gyeonggi-do (KR); Chung-ung Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 597 days.

(21) Appl. No.: 09/940,659

(22) Filed: Aug. 29, 2001

(65) Prior Publication Data

US 2002/0031058 A1 Mar. 14, 2002

(30) Foreign Application Priority Data

Jan. 20, 2000 (KR) .......................................... 2001-3415

(51) Int. Cl.[7] .............................................. G11B 33/02
(52) U.S. Cl. ..................................... 369/75.2; 369/77.1
(58) Field of Search ............................... 369/75.1, 75.2, 369/219, 178.01, 191, 192, 183, 270, 271, 77.1, 77.2, 30.78, 30.92, 30.36

(56) References Cited

U.S. PATENT DOCUMENTS

| | | | | |
|---|---|---|---|---|
| 5,828,645 A | * | 10/1998 | Kim et al. | ............... 369/30.78 |
| 6,449,234 B1 | * | 9/2002 | Ahn et al. | ................. 369/77.1 |
| 6,480,453 B2 | * | 11/2002 | Ahn | ........................... 369/75.2 |
| 6,751,182 B1 | * | 6/2004 | Shiomi et al. | ............... 369/219 |

FOREIGN PATENT DOCUMENTS

| | | |
|---|---|---|
| JP | 5-151676 | 6/1993 |
| JP | 5-266565 | 10/1993 |
| JP | 9-27180 | 1/1997 |
| JP | 9-91821 | 4/1997 |
| KR | 173345 | 4/1999 |
| KR | 1999-0041530 | 6/1999 |
| KR | 1999-0030107 | 7/1999 |

* cited by examiner

*Primary Examiner*—Ali Neyzari
(74) *Attorney, Agent, or Firm*—Staas & Halsey LLP

(57) ABSTRACT

An optical disc drive having a retractable and ejectable disc carrying tray. A compound pivot mechanism engages a turntable with a disc carried on the tray. The turntable is supported by a base chassis which pivots with respect to a main frame. A sub-chassis is pivotably connected with the mainframe and elastically coupled with the base chassis. A cam member on the main frame engages the sub-chassis to pivot the sub-chassis coincident with the tray being retracted into the main frame or ejected from the main frame. The sub-chassis in turn pivots the base chassis to engage or disengage the disc with the turntable. The tray accommodates discs having different diameters and comprises mechanisms for securing the disc while the disc is retracted into and ejected from the main frame.

35 Claims, 10 Drawing Sheets

OPTICAL DISC DRIVE

CROSS-REFERENCE TO RELATED APPLICATIONS

This application claims the benefit of Korean Application No. 2001-3415 filed Jan. 20, 2001, in the Korean Patent Office, the disclosure of which is incorporated herein by reference.

BACKGROUND OF THE INVENTION

1. Field of the Invention

The present invention relates to an optical disc drive, and more particularly, to an optical disc drive having an improved structure so that a slim optical disc drive is possible.

2. Description of the Related Art

Figure 1:
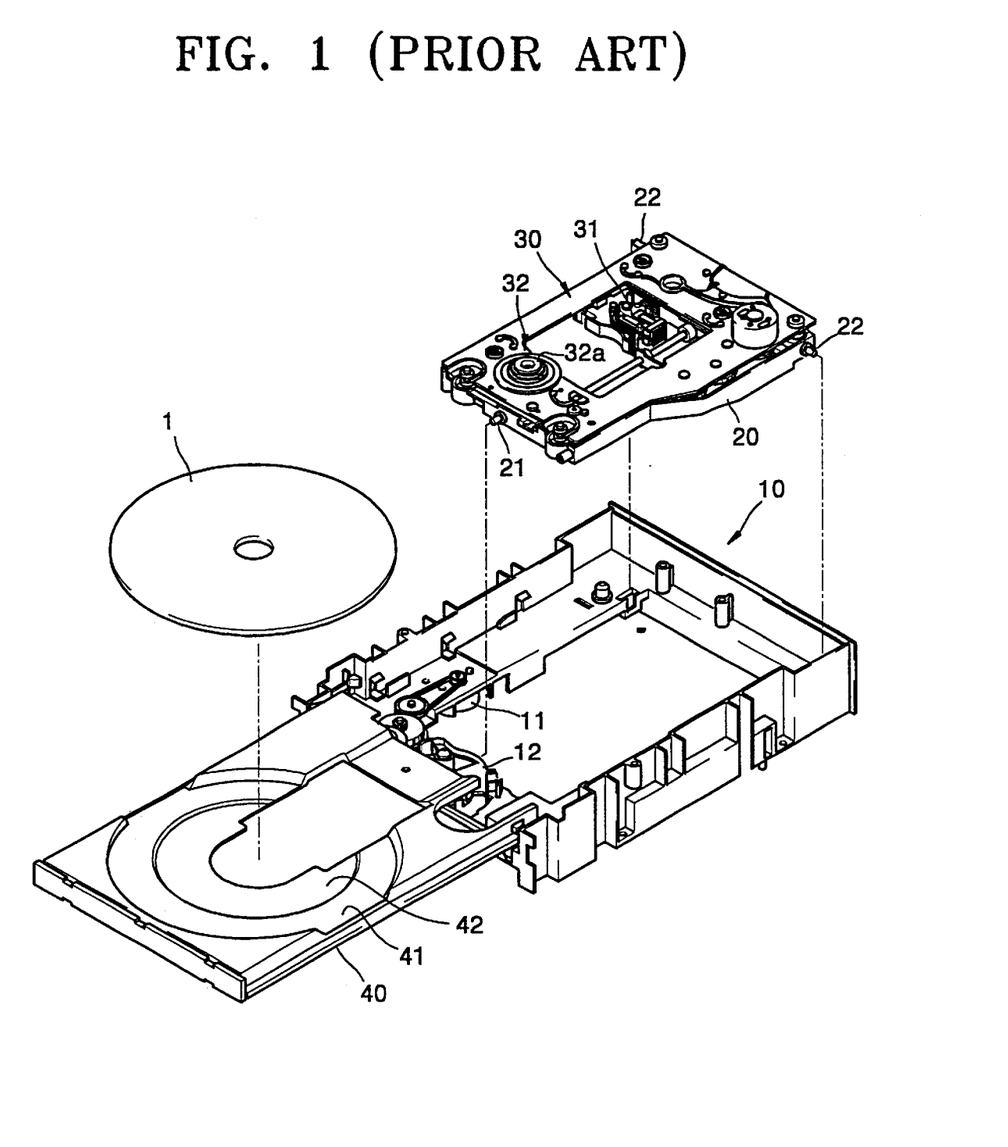
FIG. 1 is a perspective view showing a conventional optical disc drive.

In general, an optical disc drive such as a CD player or DVD player records information by emitting light onto a disc which is a recording medium or reproduces information by reading information from the disc. In a conventional optical disc drive as shown in FIG. 1, a tray 40 has a first receiving surface 41 for accommodating a disc 1 having a 120 mm diameter and a second receiving surface 42 for accommodating a disc (not shown) having a 80 mm diameter. The tray 40 moves into and out of a main frame 10 while carrying the disc. A pivoting sub-frame 20 is installed at the main frame 10. A base chassis 30 is supported on the sub-frame 20.

A turntable 32, on which the disc 1 carried by the tray 40 is placed, and an optical pickup 31 for recording information on the disc 1 or reproducing information therefrom while moving across the disc 1 are installed on the base chassis 30. A loading motor 11 drives the tray 40 to retract into and eject from the main frame 10 through a predetermined loading unit. Reference numeral 12 indicates a cam member having a cam groove (not shown) into which a cam protrusion 21 of the sub-frame 20 is inserted, for moving up and down the cam protrusion 21 according to the rotation of the loading motor 11. Thus, as the cam member 12 rotates, the cam protrusion 21 ascends and descends while moving along the trace of the cam groove. Accordingly, the sub-frame 20 pivots around a pivot axis passing through pins 22 supported by the main frame 10.

In the disc drive as shown in FIG. 1, where a disc 1 is placed on the tray 40 and the tray 40 enters the main frame 10, the cam member 12 is rotated and the sub-frame 20 pivots so that the disc 1 is placed on the turntable 32. Then, the turntable 32 rotates and the optical pickup 31 reproduces information recorded on the disc 1 or records new information thereon.

Figure 2:
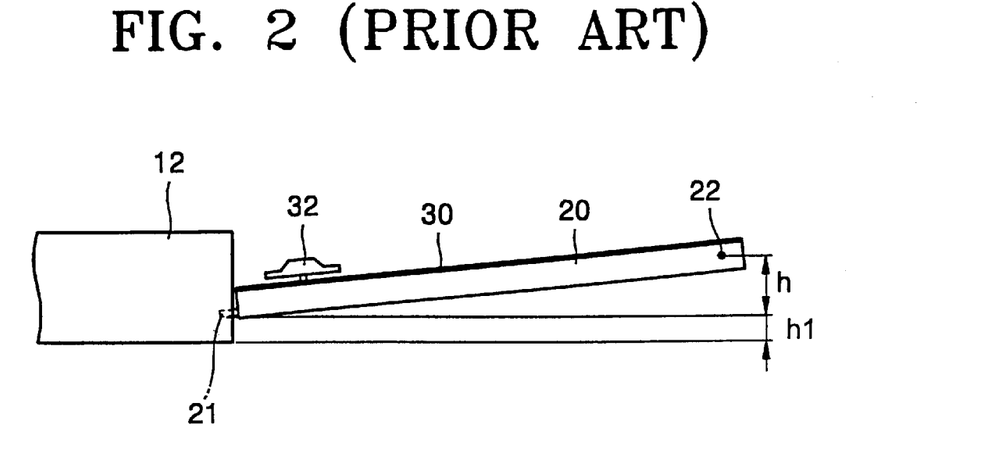
FIG. 2 is a view showing a pivot structure of a sub-frame in the optical disc drive of FIG. 1.

However, in the above conventional optical disc drive, since the cam protrusion 21 provided at the sub-frame 20 is directly inserted in the cam member 12 and thus the sub-frame 20 is moved up and down by the cam motion between the cam protrusion 21 and the cam member 12, the cam member 12 is required to be located at a position lower than the lowest position in which the cam protrusion 21 is located in a range that the sub-frame 20 pivots. That is, as shown in FIG. 2, to secure the elevation height of the turntable 32 according to pivot of the sub-frame 20, the cam member 12 inevitably occupies a space down at a lower position (h+h1) out of a pivot range (h) of the sub-frame 20. Thus, this pivot structure occupying a large space of the optical disc drive in height is considered to be an inappropriate structure considering a current trend in which products are made light and thin.

Another problem in making an optical disc drive slim is that, where an 80 mm disc is carried by being placed on the second receiving surface 42 of the tray 40, the disc is caught by a boss 32a of the turntable 32 so that the tray 40 may not be moved. For example, when the 80 mm disc placed on the turntable 32 is taken out, the sub-frame 20 is lowered and pivots to place the disc on the second receiving surface 42 of the tray 40 so that the tray 40 is taken out of the main frame 10. When the lowering height of the turntable 32 is too small in order to making an optical disc drive slim, the disc is caught by the boss 32a (FIG. 1) of the turntable 32 so that the tray 40 is not easily ejected from the main frame 10. Where the lowering height of the turntable 32 is too large, it is difficult to make an optical disc drive slim. Thus, there is a need to prevent the disc from being caught by the boss 32a while making the lowering height small.

In another conventional optical disc drive, a turntable or optical pickup is directly installed on the tray to realize a slim optical disc drive for notebook computers. However, in most cases, tray motions such as entering in or ejecting from the main frame are manually performed which inconveniences a user. Thus, an optical disc drive having a structure to solve the above problems is needed.

SUMMARY OF THE INVENTION

To solve the above problems, it is an object of the present invention to provide an optical disc drive having an improved structure which enables automatic tray loading and a slim optical disc drive.

Additional objects and advantages of the invention will be set forth in part in the description which follows, and, in part, will be obvious from the description, or may be learned by practice of the invention.

According to the present invention, a disc carrying tray is supported by a main frame. A base chassis is pivotable with respect to the main frame and supports a turntable which rotates a disc. The turntable is common with a rotor of a spindle motor which drives the turntable.

The base chassis has a free end which is elastically coupled with a free end of a sub-chassis which also pivots with respect to the main frame. An optical pickup, which records information on and reproduces information from the disc, is mounted on the base chassis. A feeding unit moves the optical pickup in a radial direction of the disc to record information on and/or reproduce information from the disc. A tray loading unit retracts the tray into and ejects the tray from the main frame.

A cam member has a cam groove which is slidingly engaged with a cam protrusion on the sub-chassis. The cam member is operationally engaged with the tray loading unit to pivot the sub-chassis as the tray loading unit retracts the tray into or ejects the tray from the main frame. The sub-chassis pivots the base chassis to engage the turntable with the disc or to disengage the turntable from the disc.

A loading motor drives a gear rail on the tray loading unit via a loading gear. A cam gear, selectively engaged with the cam member, transfers the driving force of the loading motor to the cam member. The disc drive comprises a latch which prevents escape of the tray where the tray is retracted into the main frame. The latch comprises a hooking piece formed on the tray which engages an interference piece provided on the cam gear to block a return path of the hooking piece where the tray is retracted.

The feeding unit comprises a guide rail arranged at the base chassis along a radial direction of the disc and a lead screw installed parallel to the guide rail to be rotated and driven by a motor. A gear portion provided at one side of the optical pickup is coupled to the lead screw.

The tray comprises an outer surface and a first disc receiving surface. The first disc receiving surface is formed to be recessed from the outer surface and to accommodate a disc having a first diameter. A stepped portion connects the outer surface and the first disc receiving surface.

The tray further comprises an escape preventing unit which prevents the disc from escaping from the tray by pressing the disc placed on the first disc receiving surface against the stepped portion in a direction opposite the direction in which the tray retracts. A rotary lever is installed at the outer surface of the tray. An elastic member provides an elastic force to urge the rotary lever in a direction to push the disc against the stepped portion. A locking protrusion protrudes from the outer surface of the tray toward the rotary lever to prevent the disc from being pushed above the outer surface.

A second disc receiving surface is formed to be recessed from the first disc receiving surface for accommodating a disc having a smaller diameter than the disc which is accommodated by the first disc receiving surface. The second disc receiving surface is inclined such that a depth of the second disc receiving surface decreases in a direction in which the tray retracts into the main frame.

A plurality of receiving pads for supporting the bottom surface of a disc placed on the first disc receiving surface are installed at a boundary portion between the first and second disc receiving surfaces. The pads support the disc where the disc is placed on the first disc receiving surface and/or edge portions of the disc where the disc has the smaller diameter to prevent the disc having the smaller diameter from escaping from the second disc receiving surface.

First and second sensors which generate loading and unloading operation signals are mounted on the main frame. A knob on the tray operates the first sensor to start an ejection operation and a protrusion mounted on the mainframe operates the second sensor where the tray is completely ejected from the main frame. Where the tray is completely retracted into the main frame, the knob is pressed to generate a tray unloading operation signal. Where the tray is completely ejected from the main frame and the tray is pushed into the main frame, the switching protrusion operates the second sensor to generate a loading operation signal.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

Reference will now be made in detail to the present embodiments of the present invention, examples of which are illustrated in the accompanying drawings, wherein like reference numerals refer to like elements throughout.

Figure 3A:
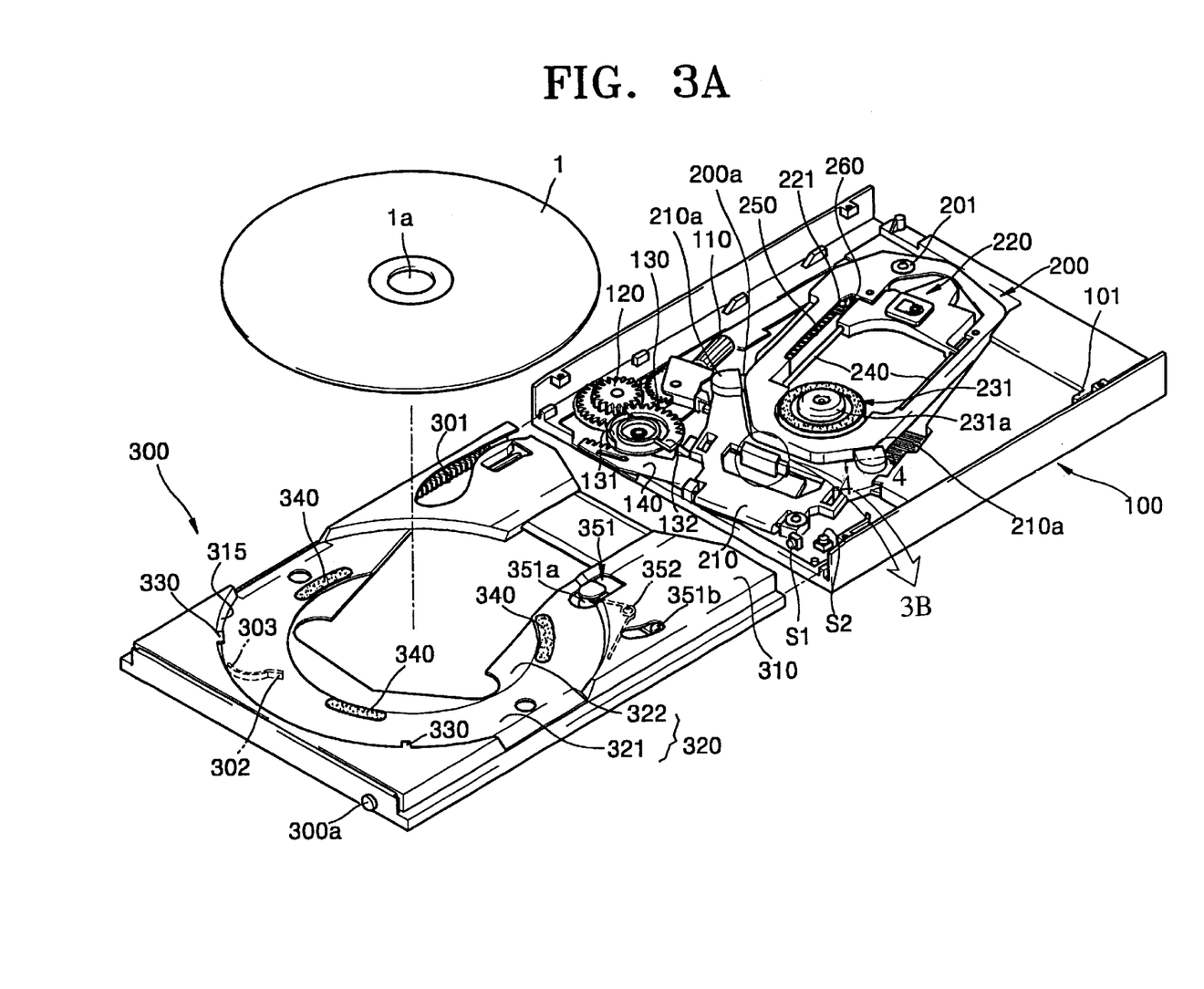
FIG. 3A is a perspective view showing an optical disc drive according to the present invention.
Figure 3B:
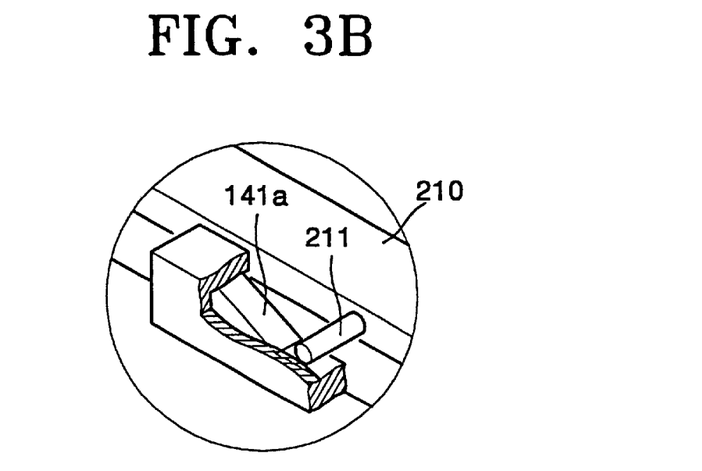
FIG. 3B is an enlarged cut away view of a portion 3B of FIG. 3A.

Referring to FIGS. 3A and 3B, in an optical disc drive according to the present invention, a tray 300 for carrying a disc 1 is adapted to retract into and eject out of a main frame 100 and a base chassis 200 is adapted to pivot with respect to the main frame 100. A turntable 231 on which the disc 1 is placed and an optical pickup 220 for recording information on or reproducing information from the disc 1 while the optical pickup 220 is moving across the disc 1 are installed at the base chassis 200. A damper 201 connects the main frame 100 and the base chassis 200 and simultaneously functions as a pivot axis of the base chassis 200.

A tray loading unit enables the tray 300 to retract into the main frame 100 and a base chassis loading unit enables the base chassis 200 to pivot so that the disc 1 placed on the tray 300 is accommodated on the turntable 231. The tray loading unit and the basis chassis loading unit are structured to make a slim disc drive. Referring to FIG. 3A, the tray loading unit comprises a loading motor 110, and a loading gear 120 for retracting the tray 300 into and ejecting the tray 300 from the main frame 100. The loading motor 110 rotates the loading gear 120 which is engaged with a gear rail 301 provided at an inner side wall of a lower surface of the tray 300. The loading gear 120 and the gear rail 301 are engaged laterally, using an otherwise empty space under the tray 300, thus the loading gear 120 and the gear rail 301 are arranged in a relatively low profile. A cam gear 130 rotates by being pushed by an engagement protrusion 302 provided at the tray 300 and engaged with the loading gear 120 as the tray 300 retracts into the main frame 100. The cam gear 130 selectively transfers power of the loading motor 110 to the base chassis loading unit.

Figure 4:
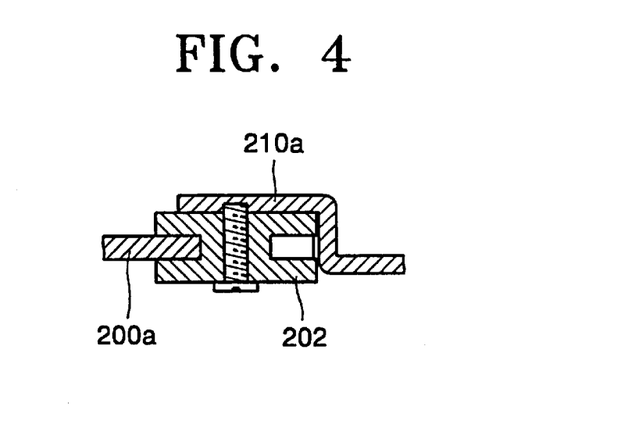
FIG. 4 is a section view taken along line 4—4 of FIG. 3A.

The base chassis loading unit pivots the base chassis 200 and comprises a cam member 140 and a sub-chassis 210. The cam member 140 slides over the main frame 100 according to the rotation of the cam gear 130 by being engaged with the cam gear 130. The cam member 140 has a cam groove 141a (FIG. 11) installed at one side for elevating the base chassis 200. The sub-chassis 210 is installed at the main frame 100 to pivot and has a free end portion 210a which is elastically coupled to a free end portion 200a of the base chassis 200 via dampers 202 (see FIG. 4) interposed between the two free end portions 200a and 210a and a cam protrusion 211 inserted in the cam groove 141a. Thus, where the cam member 140 is moved by the rotation of the cam gear 130, the cam protrusion 211 slides along the cam groove 141a so that the sub-chassis 210 pivots. Accordingly, the free end portion 200a of the base chassis 200 ascends so that where the disc 1 is placed on the tray 300, the disc 1 is supported on the turntable 231. The above operation will be described in greater detail below.

Figure 5:
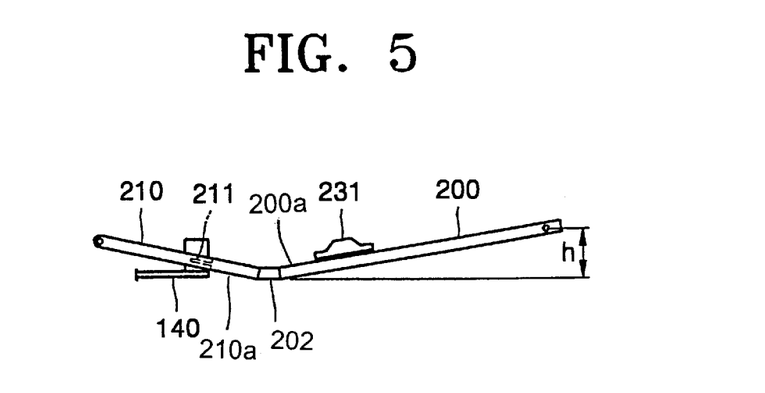
FIG. 5 is a view showing a pivot structure of the base chassis in the optical disc drive shown in FIG. 3A.

The base chassis 200 is not directly connected to the cam member 140, but is connected via the sub-chassis 210 to obtain a slim optical disc drive. If a cam protrusion were to protrude from the free end portion 200a of the base chassis 200 and connect directly to the cam groove 141a of the cam member 140, the cam member 140 would need to be located at a position lower than the lowest position of the free end portion 200a of the base chassis 200. However, according to the present invention, the free end portion 200a of the base chassis 200 is coupled to the free end portion of the sub-chassis 210 and the cam protrusion 211 is formed on the sub-chassis 210, as shown in FIG. 5. Thus, the cam member 140 is located at a position higher than the lowest position of the free end portion 200a of the base chassis 200. Further, since the cam member 140 is positioned within a pivot range of the base chassis 200, no additional height is needed so that the arrangement shown in FIG. 5 is advantageous in making a slim optical disc drive.

Figure 11:
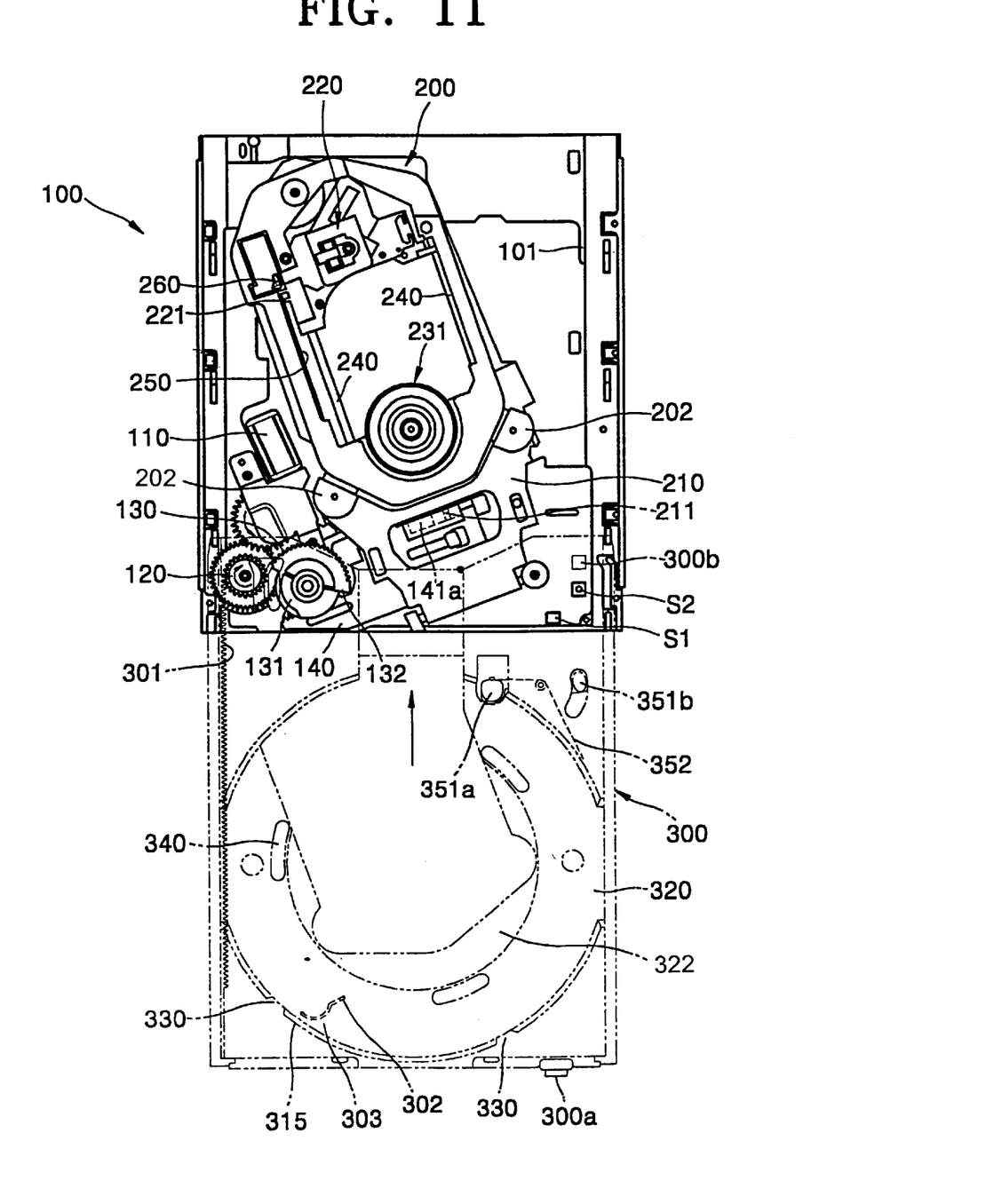
FIGS. 11 through 13 are sequential views showing a loading process.
Figure 12:
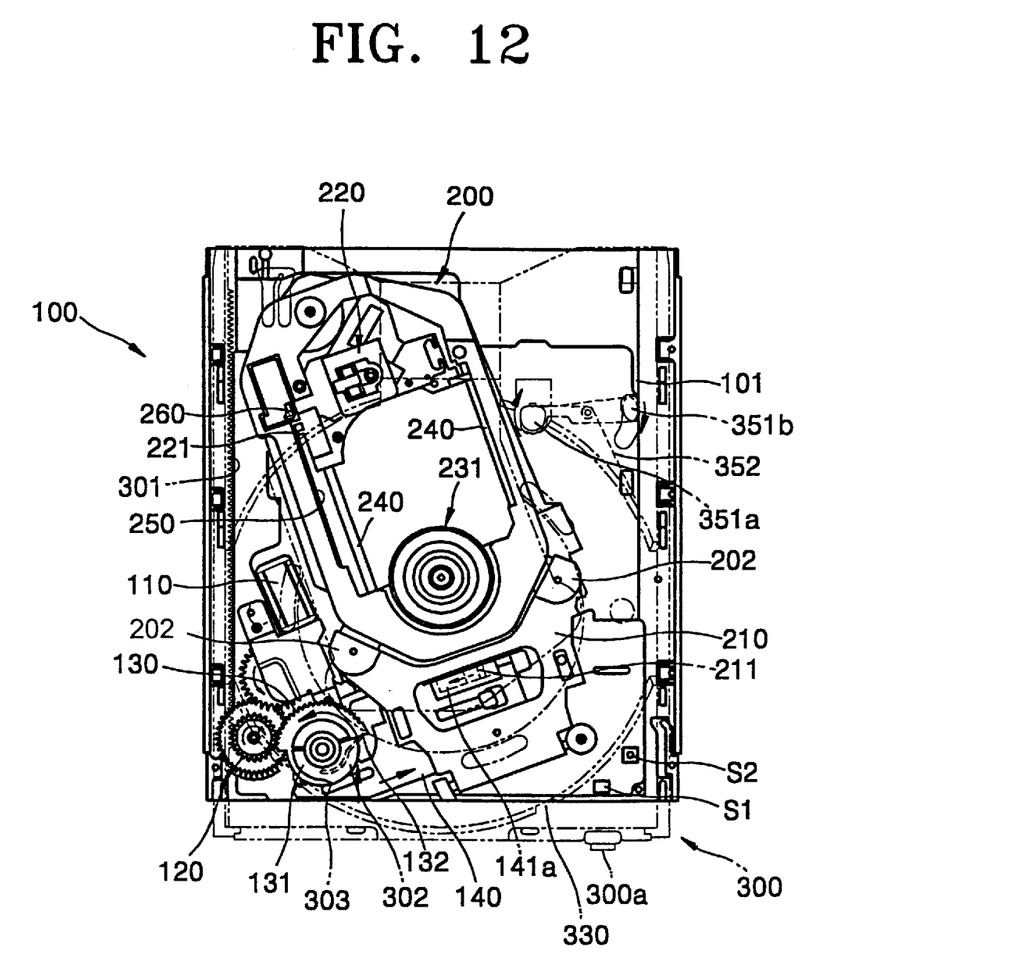
Figure 13:
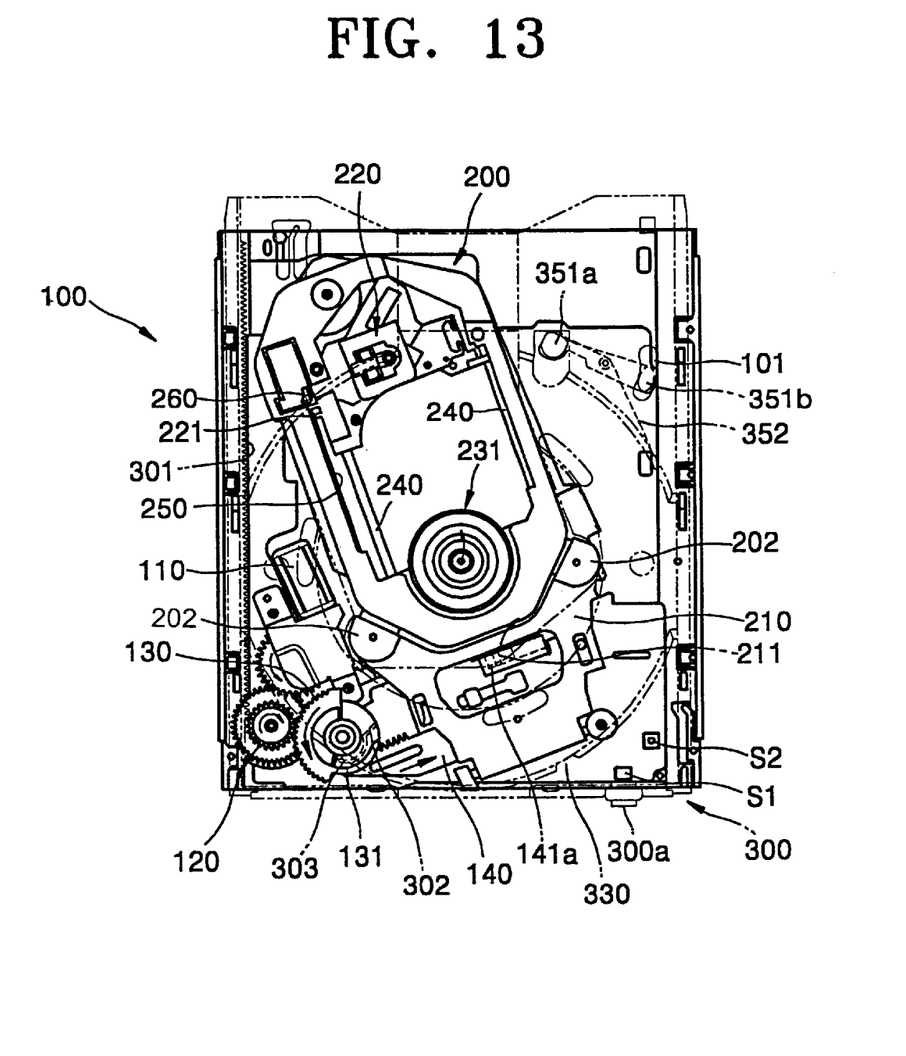

Also, where the disc 1 is placed on the turntable 231, the feeding unit moves the optical pickup 220 in a radial direction of the disc 1 so that the optical pickup 220 can record information on and reproduce information from the disc 1. Referring now to FIGS. 11,12 and 13, the feeding unit comprises a guide rail 240 for guiding the movement of the optical pickup 220, a lead screw 250 arranged parallel to the guide rail 240, a gear portion 221 provided at the optical pickup 220 and engaged with the lead screw 250, and a motor 260 for driving the lead screw 250. Thus, as the lead screw 250 is rotated by driving of the motor 260, the optical pickup 220 coupled to the lead screw 250 via the gear portion 221 moves along the guide rail 240 and emits light onto the disc 1.

Figure 6:
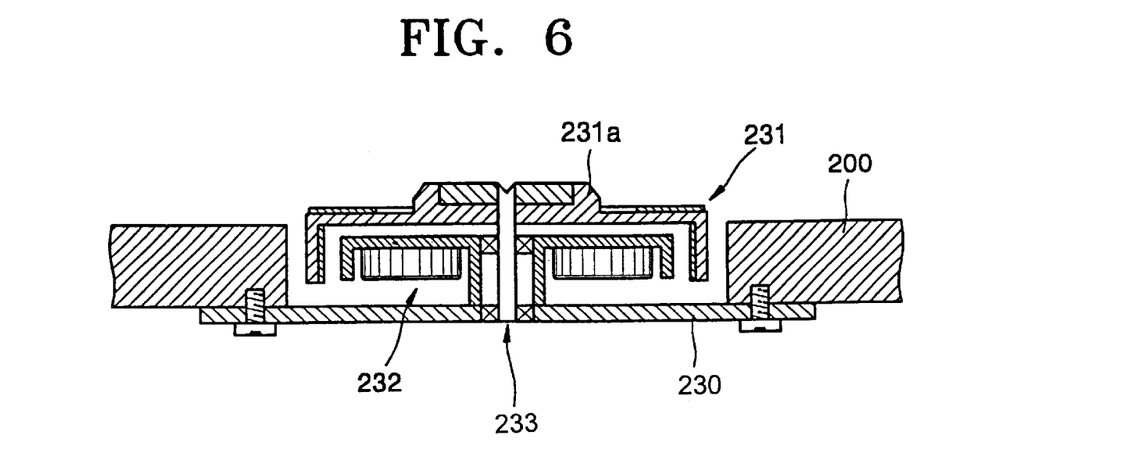
FIG. 6 is a sectional view showing the turntable and spindle motor shown in FIG. 3A.

Referring now to FIG. 6, the turntable 231 is formed integral with the rotor of a spindle motor 230 and rotates about spindle 233. A boss 231a is formed on the turntable 231 to receive a center hole 1a of the disc 1. The turntable 231 is rotated by the electrical interaction of the rotor portion of the turntable 231 with a stator 232. This motor arrangement is also advantageous in reducing the thickness of the optical disc drive.

Figure 7:
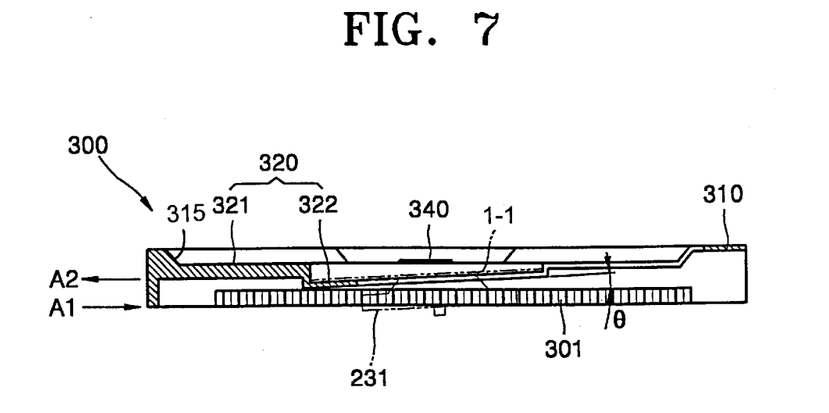
FIG. 7 is a sectional view showing the tray shown in FIG. 3A.
Figure 8:
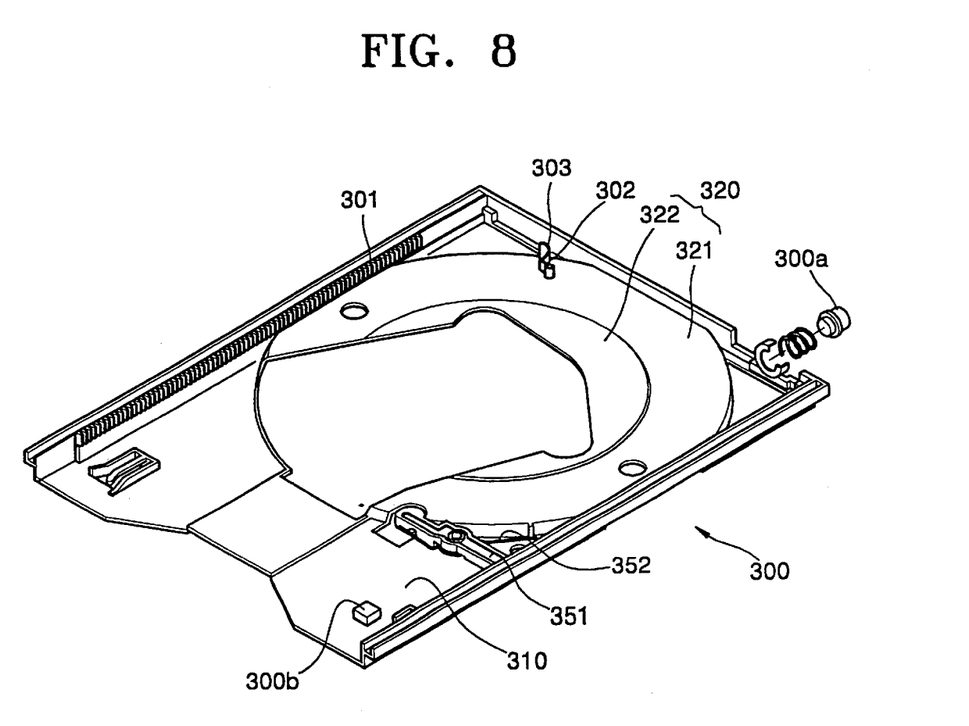
FIG. 8 is a perspective view showing the bottom surface of the tray shown in FIG. 3A.

Referring now to FIGS. 7 and 8, the tray 300 comprises an outer surface 310 and a disc receiving surface 320. The disc receiving surface 320 is recessed from an outer surface 310 so that the disc 1 may be placed thereon. The disc receiving surface 320 comprises a first disc receiving surface 321 for accommodating a disc having a diameter of 120 mm and a second disc receiving surface 322 for accommodating a disc having a diameter of 80 mm. The second disc receiving surface 322 is more recessed from the outer surface 310 than the first disc receiving surface 321. The second disc receiving surface 322 is inclined so that an edge of the disc in a direction in which the tray 300 retracts is higher than an edge of the disc in a direction in which the tray 300 ejects, where the directions of retraction and ejection are indicated by the arrows A1 and A2, respectively, in FIG. 7. A distance that the turntable 231 is lowered to allow the disc 1 to retract and to eject is reduced as the optical disc drive is made slim. Thus, where the tray 300 is ejected, the 80 mm disc may be caught by the boss 231a of the turntable 231 after the base chassis 200 is completely lowered. To prevent the above problem, as shown in FIG. 7, the second disc receiving surface 322 is formed to be inclined at a predetermined angle θ to gradually rise in the direction A1 in which the tray 300 retracts. Accordingly, since the tray 300 is ejected in a direction indicated by arrow A2 while a disc 1—1 is inclined, slight lowering of the turntable 231 can prevent the disc 1—1 from being caught by the boss 231a.

A disc escape preventing apparatus is provided on the tray 300 so that where the disc drive is installed vertically and the disc 1 is placed on the first disc receiving surface 321, the disc 1 is supported and escaping of the disc 1 is prevented. The disc escape preventing apparatus prevents escape of the disc 1 by pressing the edge portion of the disc 1 placed on the first disc receiving surface 321 in a radial direction toward a stepped portion 315 between the outer surface 310 and the first disc receiving surface 321. As shown in FIGS. 3A and 8, the disc escape preventing apparatus includes a rotary lever 351 rotatably installed at the outer surface 310 and a torsion spring 352 for elastically biasing the rotary lever 351 in a direction in which a pressing groove 351a presses the edge portion of the disc 1. Thus, escape of the disc 1 placed on the first disc receiving surface 321 is prevented as the disc 1 closely contacts the step portion 315 at the opposite side. The rotary lever 351 is installed at the outer surface 310 of the tray 300 so that the rotary lever 351 is close to the main frame 100 where the tray 300 is in an ejected position. Thus, the disc 1 is pressed against the stepped portion 315 disposed far from the main frame 100.

Figure 9:
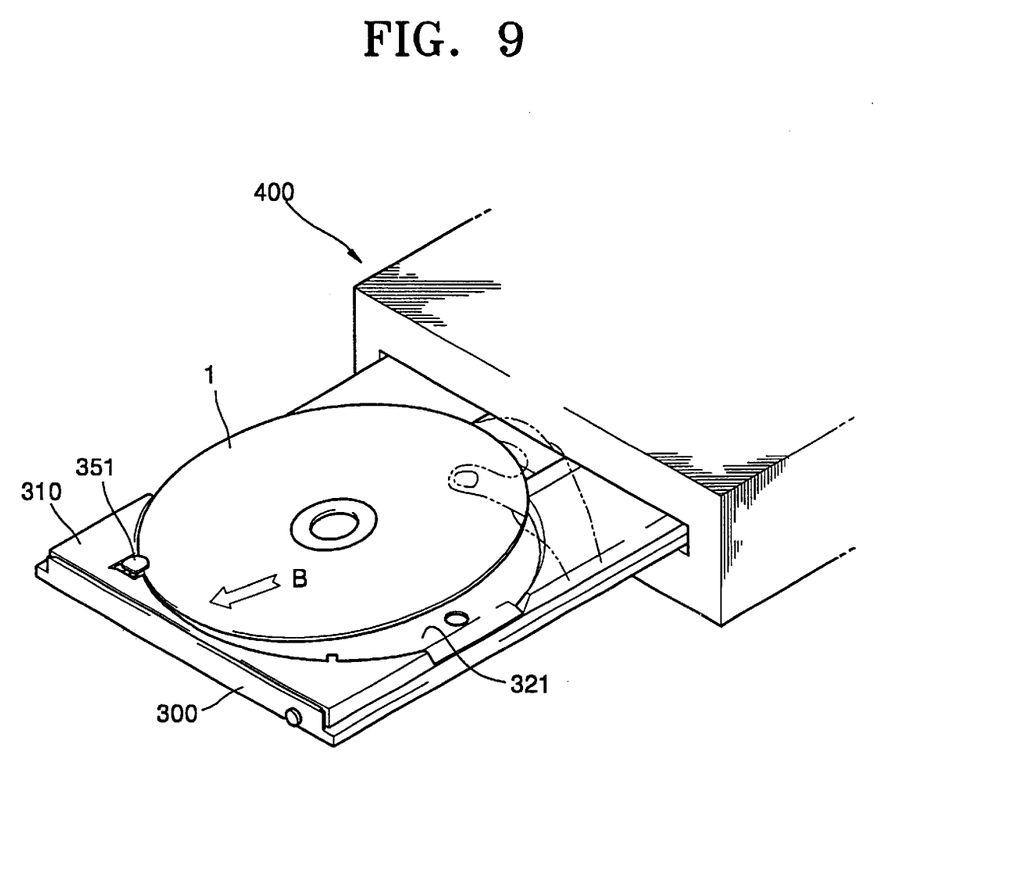
FIG. 9 is a perspective view for explaining an inconvenience in loading a disc where the rotary lever is positioned differently from the position shown in FIG. 3A.

The direction in which the rotary lever 351 presses the disc 1 is convenient for loading the disc 1. If the rotary lever 351 is installed at the outer surface 310 far from the main frame 100, as shown in FIG. 9, the disc 1 must be loaded by pressing the rotary lever 351 in a direction indicated by arrow B. Here, where the disc 1 is loaded in the direction B, a hand of a user holding the disc 1 contacts a main body 400 of the optical disc drive, which which makes loading the disc 1 inconvenient. In contrast, where the rotary lever 351 is arranged as shown in FIGS. 3 and 8, that is, the disc 1 is loaded on the first disc receiving surface 321 in a direction toward the main frame 100, the inconvenience described with reference to FIG. 9 does not occur.

Figure 10A:
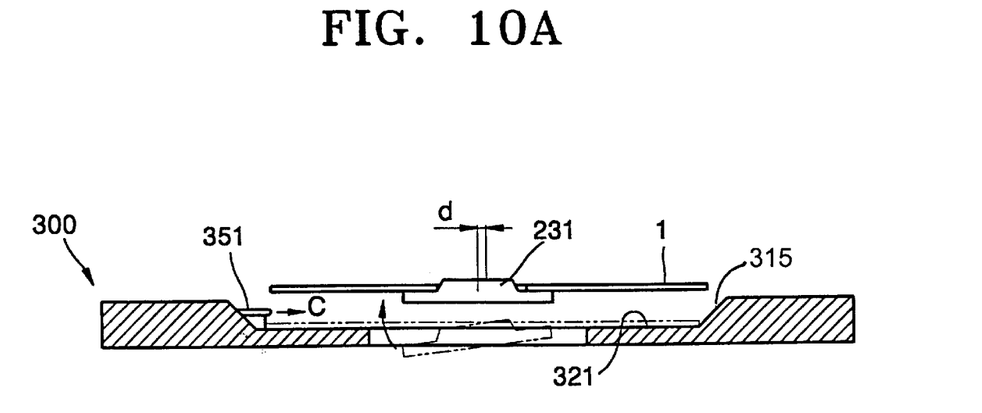
FIGS. 10A and 10B are views for explaining a problem of eccentricity of the disc generated where the rotary lever us positioned differently from the position shown in FIG. 3A.
Figure 10B:
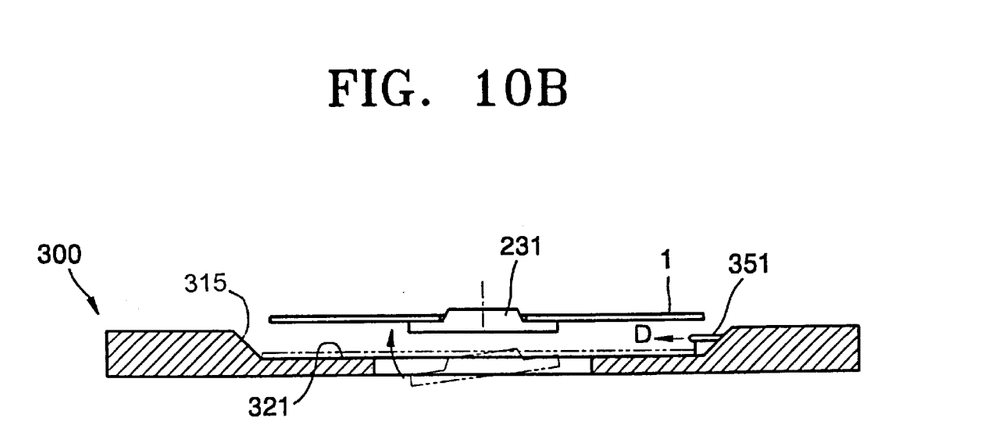

Referring again to FIGS. 3 and 8, the direction in which the rotary lever 351 presses the disc 1 is advantageous in that the center of rotation of the turntable 231 matches the center of the disc 1 when the disc 1 is placed on the turntable 231. If the disc 1 is loaded in the direction B as shown in FIG. 9, the disc 1 is placed on the first disc receiving surface 321 by being deviated toward the inside of the main frame 100 as indicated by an arrow C in which the tray 300 retracts, as shown in FIG. 10A. However, since the turntable 231 lifts the disc 1 while pivoting as shown in FIG. 10A, where the disc 1 is deviated toward the main frame 100, the turntable lifts the disc 1 at a point that is deviated from the center of the disc 1 in the direction far from the main frame 100. Thus, eccentricity as much as a distance d is generated. However, in the present invention, as shown in FIG. 10B, the rotary lever 351 urges the disc 1 to be deviated in a direction indicated by an arrow D, opposite the direction of the arrow C of FIG. 10A. Where the turntable 231 pivots to lift the disc 1, the centers of the turntable 231 and the disc 1 are well matched and disc loading becomes convenient and the eccentricity of the disc is reduced.

A thickness of the rotary lever 351 which is less than the height of the stepped portion 315 is advantageous in making a slim optical disc drive. Where the tray 300 is almost fully retracted into the main frame 100, an end portion 351b (FIG. 3A) of the rotary lever 351 engages a stopper 101 provided at the main frame, rotating the rotary lever 351 so that the pressing toward the disc 1 is removed. Where the rotary lever 351 presses the disc 1 against the stepped portion 315, a locking protrusion 330 prevents the disc 1 from being pushed over the outer surface 310.

A plurality of receiving pads 340 are installed at a boundary portion between the first and second disc receiving surfaces 321 and 322. Where a 120 mm disc is used, the receiving pads 340 support a bottom surface of the 120 mm disc. Where an 80 mm disc is used, the receiving pads 340 support a side edge portion of the 80 mm disc so that the 80 mm disc cannot escape from the second disc receiving surface 322. Since the receiving pads 340 are installed inwardly with respect to an outer edge portion of the 120 mm disc, the outer edge portion of the disc 1 has a margin for slightly moving up and down. Where there is a margin for the edge portion of the disc 1 to move, it becomes easy to load the disc 1 while fitting the edge portion of the disc 1 to the pressing groove 351 a of the rotary lever 351.

Referring now to FIGS. 3A and 3B, a curved hooking piece 303 extending from the engagement protrusion 302 is provided at the bottom surface of the tray 300. The hooking piece 302, together with an interference piece 131 provided at a horizontal surface of the cam gear 130, functions as a locking means for preventing escape of the tray 300. That is, as the tray 300 retracts into the main frame 100, the cam gear 130 rotates and the interference piece 131 is moved to a position for blocking a return path of the hooking piece 303 so that the tray 300 cannot escape from the main frame 100.

First and second switches S1 and S2 sense loading and unloading actions of the tray 300, respectively. The first and second switches S1 and S2 are operated by a knob 300a and a switching protrusion 300b provided at the tray 300. Where the tray 300 completely retracts into the main frame 100, the first switch S1 is disposed to contact the knob 300a (see FIG. 13). Thus, where the knob 300a is pressed in this state, the first switch S1 is also pressed and operated to generate a signal for driving the loading motor 110 in the direction in which the tray 300 is ejected. Where the tray 300 is completely ejected from the main frame 100, the switching protrusion 300b contacts the second switch S2. With the tray 300 ejected, where the tray 300 is slightly pushed into the main frame 100, the switching protrusion 300b is separated from the second switch S2 (refer to FIG. 11), to generate a signal for driving the loading motor 1100 to retract the tray 300 into the main frame 100. Thus, the tray 300 is unloaded by pressing the knob 300a and the tray 300 is loaded by slightly pushing the tray 300.

The disc loading operation of the optical disc drive according to the present invention is performed as follows. Assuming that a disc having a 120 mm diameter is used, the disc 1 to be used is placed on the first disc receiving surface 321 of the tray 300 and the edge of the disc 1 is placed to fit in the pressing groove 351a of the rotary lever 351. Thus, the disc 1 is firmly supported on the first disc receiving surface 321 by a pressing force of the rotary lever 351 by the torsion spring 352.

With the disc loaded on the tray 300, the tray 300 is slightly pushed into the main frame 100, separating the switching protrusion 300b from the second switch S2, so that the loading motor 110 is driven. As shown in FIG. 11, the loading gear 120 engaged with the gear rail 301 is rotated, and the tray 300 retracts into the main frame 100.

Where the tray 300 is almost fully retracted into the main frame 100, as shown in FIG. 12, the engagement protrusion 302 at the bottom surface of the tray 300 pushes a protruding portion 132 of the cam gear 130 so that the tray 300 is slightly pushed upward. Accordingly, the cam gear 130 is engaged with the loading gear 120 and as the loading gear 120 rotates the cam gear 130 is rotated so that the cam member 140 slides. Here, as one end portion 351b of the rotary lever 351 is engaged by the stopper 101 and the tray 300 retracts, the rotary lever 351 is rotated. Thus, the pressing force to the disc 1 is removed.

As the cam member 140 is moved, the sub-chassis 210 pivots by a cam motion of the cam groove 141a and the cam protrusion 211. Simultaneously, the base chassis 200 having the free end portion 200a connected to the free end portion 210a of the sub-chassis 210 pivots. As a result, as shown in FIG. 13, as the base chassis 200 ascends, the disc 1 is received on the turntable 231.

Here, the interference piece 131 of the cam gear 130 returns to the position in which a returning path of the hooking piece 303 of the tray 300 is blocked. Thereafter, the feeding unit moves the optical pickup 220, to perform recording or reproducing information on or from the disc 1. When the first switch S1 is operated by pressing the knob 300a, the unloading action is performed in the reverse order. Thus, loading and unloading actions can be automatically performed in the slim optical disc drive of the present invention.

As described above, in the optical disc drive according to the present invention, automatic loading and unloading of the tray is realized and a space for a pivot is reduced, so that an entire thickness of the optical disc drive is reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical disc drive for use with a disc, comprising:
    a main frame;
    a tray to transport the disc;
    a base chassis which is pivotable with respect to the main frame, the base chassis having a free end portion and comprising:
        a turntable to rotate the disc,
        an optical pickup which records information on and reproduces information from the disc, and
        a feeding unit which moves the optical pickup in a radial direction of the disc;
    a tray loading unit which retracts the tray into the main frame;
    a sub-chassis which is pivotable with respect to the main frame, the sub-chassis having a free end portion coupled to the free end portion of the base chassis, the sub-chassis comprising a cam protrusion; and
    a cam member having a groove, the cam groove slidingly engaged with the cam protrusion, the cam member operationally engaged with the tray loading unit to pivot the sub-chassis as the tray loading unit retracts the tray into the main frame, the sub-chassis pivoting the base chassis to engage the turntable with the disc.

2. The optical disc drive as claimed in claim 1, wherein the free end portion of the base chassis and the free end portion of the sub-chassis are elastically coupled.

3. The optical disc drive as claimed in claim 1, wherein the tray further comprises a gear rail and the tray loading unit comprises:
    a loading motor;
    a loading gear engaged with the gear rail, the loading gear rotated by the loading motor to retract the tray into and eject the tray from the main frame; and
    a cam gear engaged with the cam member and rotated by being selectively connected to the loading gear to transfer a driving force of the loading motor to the cam member.

4. The optical disc drive as claimed in claim 3, further comprising a latch which prevents escape of the tray after retracting the tray into the main frame.

5. The optical disc drive as claimed in claim 4, wherein the latch comprises:
   a hooking piece formed at a bottom surface of the tray; and
   an interference piece, provided at one side of a horizontal surface of the cam gear, to block a return path of the hooking piece where the tray retracts.

6. The optical disc drive as claimed in claim 1, wherein the feeding unit comprises:
   a guide rail arranged at the base chassis along a radial direction of the disc;
   a lead screw installed parallel to the guide rail to be rotated and driven by a motor; and
   a gear portion provided at one side of the optical pickup to be coupled to the lead screw.

7. The optical disc drive as claimed in claim 1, wherein the tray comprises:
   an outer surface;
   a disc receiving surface formed to be recessed from the outer surface, accommodating the disk;
   a stepped portion which connects the outer surface and the disc receiving surface, and
   an escape preventing unit which prevents the disc from escaping from the tray by pressing the disc placed on the disc receiving surface against the stepped portion in a direction opposite the direction in which the tray retracts.

8. The optical disc drive as claimed in claim 7, wherein the escape preventing unit comprises:
   a rotary lever rotatably installed at the outer surface of the tray; and
   an elastic member which provides an elastic force to urge the rotary lever in a direction to push the disc against the stepped portion.

9. The optical disc drive as claimed in claim 8, wherein the escape preventing unit further comprises a locking protrusion which protrudes from the outer surface toward the rotary lever to prevent the disc from being pushed above the outer surface.

10. The optical disc drive as claimed in claim 1, wherein the tray comprises:
    an outer surface;
    a first disc receiving surface formed to be recessed from the outer surface, accommodating a disc having a first diameter; and
    a second disc receiving surface formed to be recessed from the first disc receiving surface, accommodating a disc having a second diameter smaller than the first diameter,
    wherein the second disc receiving surface is inclined such that a depth of the second disc receiving surface decreases in a direction in which the tray retracts into the main frame.

11. The optical disc drive as claimed in claim 10, wherein the tray further comprises a plurality of pads installed at a boundary portion between the first and second disc receiving surfaces, which pads support edge portions of the disc having the second diameter to prevent the disc having the second diameter from escaping from the second disc receiving surface.

12. The optical disc drive as claimed in claim 1, wherein the turntable is common with a rotor of a spindle motor.

13. The optical disc drive as claimed in claim 1, wherein:
    the mainframe further comprises first and second sensors; and
    the tray further comprises:
      a knob which operates the first sensor, and
      a protrusion which operates the second sensor where the tray is completely ejected from the main frame;
      wherein:
        where the tray is completely retracted into the main frame, the knob is pressed, to generate a tray unloading operation signal; and
        where the tray is completely ejected from the main frame and the tray is pushed into the main frame, the switching protrusion operates the second sensor to generate a loading operation signal.

14. An optical disc drive having a main frame and a disc carrying tray which is retractable into and ejectable from the main frame, wherein the tray comprises:
    an outer surface;
    a first disc receiving surface formed to be recessed from the outer surface for accommodating a disc having a first diameter; and
    a second disc receiving surface formed to be recessed from the first disc receiving surface for accommodating a disc having a second diameter smaller than the first diameter,
    wherein the second disc receiving surface is inclined such that a depth of the second disc receiving surface decreases in a direction in which the tray retracts into the main frame.

15. The optical disc drive as claimed in claim 14, wherein the tray further comprises a plurality of pads installed at a boundary portion between the first and second disc receiving surfaces which pads support edge portions of the disc having the smaller diameter disc to prevent the disc having the second diameter from escaping from the second disc receiving surface.

16. The optical disc drive as claimed in claim 14, wherein the tray further comprises an escape preventing unit which prevents the disc having the first diameter from escaping from the tray by pressing the disc having the first diameter placed on the first disc receiving surface against a stepped portion between the first disc receiving surface and the outer surface in a direction opposite the direction in which the tray retracts.

17. The optical disc drive as claimed in claim 16, wherein the escape preventing unit comprises:
    a rotary lever rotatably installed at the outer surface of the tray; and
    an elastic member which provides an elastic force to urge the rotary lever in a direction to push the disc against the stepped portion.

18. The optical disc drive as claimed in claim 17, wherein the escape preventing unit further comprises a locking protrusion which protrudes from the outer surface toward the rotary lever to prevent the disc from being pushed above the outer surface.

19. The optical disc drive as claimed in claim 14, wherein:
    the mainframe further comprises first and second sensors; and
    the tray further comprises:
      a knob which operates the first sensor, and
      a protrusion which operates the second sensor where the tray is completely ejected from the main frame;
      wherein:

where the tray is completely retracted into the main frame, the knob is pressed, to generate a tray unloading operation signal; and where the tray is completely ejected from the main frame and the tray is pushed into the main frame, the switching protrusion operates the second sensor to generate a loading operation signal.

20. An optical disc drive having a main frame and a tray to carry a disc and which is retractable into and ejectable from the main frame, wherein the tray comprises:
   an outer surface;
   a disc receiving surface formed to be recessed from the outer surface, accommodating the disc; and
   an escape preventing unit which prevents the disc from escaping from the tray by pressing the disc placed on the disc receiving surface against a stepped portion between the disc receiving surface and the outer surface in a direction opposite the direction in which the tray retracts.

21. The optical disc drive as claimed in claim 20, wherein the escape preventing unit comprises:
   a rotary lever rotatably installed at the outer surface of the tray; and
   an elastic member which provides an elastic force to urge the rotary lever in a direction to push the disc against the stepped portion.

22. The optical disc drive as claimed in claim 21, wherein the escape preventing unit further comprises a locking protrusion which protrudes from the outer surface toward the rotary lever to prevent the disc from being pushed above the outer surface.

23. The optical disc drive as claimed in claim 20,
   the mainframe further comprises first and second sensors; and
   the tray further comprises:
      a knob which operates the first sensor and
      a protrusion which operates the second sensor where the tray is completely ejected from the main frame; wherein:
   where the tray is completely retracted into the main frame, the knob is pressed, to generates a tray unloading operation signal; and
   where the tray is completely ejected from the main frame and the tray is pushed into the main frame, the switching protrusion operates the second sensor to generate a loading operation signal.

24. A disc carrying tray for an optical disc drive which tray is retractable into and ejectable from the main frame, the tray comprising:
   an outer surface;
   a first disc receiving surface formed to be recessed from the outer surface, accommodating a disc having a first diameter; and
   a second disc receiving surface formed to be recessed from the first disc receiving surface, accommodating a disc having a second diameter smaller than the first diameter, wherein the second disc receiving surface is inclined such that a depth of the second disc receiving surface decreases in a direction in which the tray retracts into the main frame.

25. The tray as claimed in claim 24, wherein the tray further comprises a plurality of pads installed at a boundary portion between the first and second disc receiving surfaces, which pads support edge portions of the disc having the second diameter to prevent the disc having the second diameter from escaping from the second disc receiving surface.

26. The tray as claimed in claim 24, wherein the tray further comprises an escape preventing unit which prevents the disc having the first diameter from escaping from the tray by pressing the disc having the first diameter placed on the first disc receiving surface against a stepped portion between the first disc receiving surface and the outer surface in a direction opposite the direction in which the tray retracts.

27. The tray as claimed in claim 26, wherein the escape preventing unit comprises:
   a rotary lever rotatably installed at the outer surface of the tray; and
   an elastic member which provides an elastic force to urge the rotary lever in a direction to push the disc having the first diameter against the stepped portion.

28. The tray as claimed in claim 27, wherein the escape preventing unit further comprises a locking protrusion which protrudes from the outer surface toward the rotary lever to prevent the disc having the first diameter from being pushed above the outer surface.

29. A tray for an optical disc drive which carries a disc and is installed to be capable of retracting and being ejected with respect to a main frame, the tray comprising:
   an outer surface;
   a disc receiving surface formed to be recessed from the outer surface, accommodating the disc; and
   an escape preventing unit which prevents the disc from escaping from the tray by pressing the disc placed on the disc receiving surface against a stepped portion between the disc receiving surface and the outer surface in a direction opposite the direction in which the tray retracts.

30. The tray as claimed in claim 29, wherein the escape preventing unit comprises:
   a rotary lever rotatably installed at the outer surface of the tray; and
   an elastic member which provides an elastic force to urge the rotary lever in a direction to push the disc against the stepped portion.

31. The optical disc drive as claimed in claim 30, wherein the escape preventing unit further comprises a locking protrusion which protrudes from the outer surface toward the rotary lever to prevent the disc from being pushed above the outer surface.

32. An optical disc drive having a main frame and a tray for transporting a disc, which tray retracts into and ejects from the main frame, the optical disc drive comprising:
   a tray loading unit which retracts the tray into the main frame;
   a turntable to rotate the disc;
   a base chassis which pivots with respect to the main frame and which supports the turntable, the base chassis having a free end portion;
   a sub-chassis which pivots with respect to the main frame, the sub-chassis having a free end portion coupled to the free end portion of the base chassis, the sub-chassis comprising a cam protrusion; and
   a cam member having a groove, the cam groove slidingly engaged with the cam protrusion and operationally engaged with the tray loading unit to pivot the sub-chassis as the tray loading unit retracts the tray into the main frame, the sub-chassis pivoting the base chassis to engage the turntable with the disc.

33. The optical disc drive as claimed in claim 32, wherein the free end portion of the base chassis and the free end portion of the sub-chassis are elastically coupled.

34. The optical disc drive as claimed in claim 32, wherein the tray further comprises a gear rail and the tray loading unit comprises:

a loading motor;

a loading gear engaged with the gear rail, the loading gear rotated by the loading motor to retract the tray into and eject the tray from the main frame; and a cam gear engaged selectively engaged with the loading gear to transfer a driving force of the loading motor to the cam member.

35. The optical disc drive as claimed in claim 32, further comprising a latch which prevents escape of the tray after retracting into the main frame.

* * * * *

UNITED STATES PATENT AND TRADEMARK OFFICE
CERTIFICATE OF CORRECTION

PATENT NO. : 6,804,184 B2
DATED : October 12, 2004
INVENTOR(S) : Cheol-woong Ahn et al.

It is certified that error appears in the above-identified patent and that said Letters Patent is hereby corrected as shown below:

Title page,
Item [30], Foreign Application Priority Data, change "Jan. 20, 2000" to
-- Jan. 20, 2001 --.

Column 11,
Line 57, after "diameter" insert a new paragraph.

Signed and Sealed this

Third Day of May, 2005

JON W. DUDAS
*Director of the United States Patent and Trademark Office*